United States Patent [19]
Nakano

[11] Patent Number: 5,195,069
[45] Date of Patent: Mar. 16, 1993

[54] TRACK JUMP CONTROLLING APPARATUS WHICH CAN OUTPUT DECELERATING PULSES BY SWITCHING A SERVO ON AFTER A FIXED TIME

[75] Inventor: Junichi Nakano, Hachioji, Japan

[73] Assignee: Olympus Optical Co., Ltd., Tokyo, Japan

[21] Appl. No.: 684,722

[22] Filed: Apr. 15, 1991

[30] Foreign Application Priority Data

Apr. 19, 1990 [JP] Japan .................. 2-103979

[51] Int. Cl.$^5$ .............................................. G11B 7/00
[52] U.S. Cl. .................... 369/32; 369/44.28; 369/43
[58] Field of Search ............ 369/32, 33, 43, 44.11, 369/44.28, 44.29, 44.34, 44.35, 44.26, 44.25, 44.41; 360/77.07, 77.08, 77.11

[56] References Cited

U.S. PATENT DOCUMENTS

| | | | |
|---|---|---|---|
| 4,544,872 | 10/1985 | Hirano | 369/44.29 X |
| 4,613,963 | 9/1986 | Hirano | 369/44.29 X |
| 4,785,439 | 11/1988 | Okada | 369/32 X |
| 4,803,675 | 2/1989 | Komatsu | 309/44.29 X |
| 4,817,069 | 3/1989 | Shigemori | 369/44.28 X |
| 4,817,073 | 3/1989 | Suzuki | 369/44.28 X |
| 4,819,219 | 4/1989 | Nagano | 369/32 X |
| 4,843,601 | 6/1989 | Eguchi | 369/32 X |
| 4,899,325 | 2/1990 | Katsuhara | 369/32 X |

FOREIGN PATENT DOCUMENTS

| | | | |
|---|---|---|---|
| 0289309 | 11/1988 | European Pat. Off. | 369/44.28 |
| 0117328 | 5/1988 | Japan | 369/44.28 |
| 64-109538 | 4/1989 | Japan . | |
| 64-229473 | 9/1989 | Japan . | |

Primary Examiner—Aristotelis Psitos
Assistant Examiner—Mohammad Edun
Attorney, Agent, or Firm—Armstrong, Westerman, Hattori, McLeland & Naughton

[57] ABSTRACT

In order to make a track jump from the present track to a target track, accelerating pulses and decelerating pulses are sequentially fed to a tracking actuator driving an objective lens condensing and radiating light beams to a disc, then a tracking servo is switched on, a tracking error signal within a fixed time after the decelerating pulses is monitored with a zero cross comparator or the like and further the decelerating pulses can be additionally output to the tracking actuator in response to the output of this comparator. In case it is hard for the light spot to reach the target track, the light spot will be pulled to the target track side by switching on the tracking servo and, in case it passes over the target track, the light spot will be suppressed in passing over the switching on the tracking servo and the movement of the light spot will be decelerated by the additionally output decelerating pusles to pull the light spot into the target track.

13 Claims, 4 Drawing Sheets

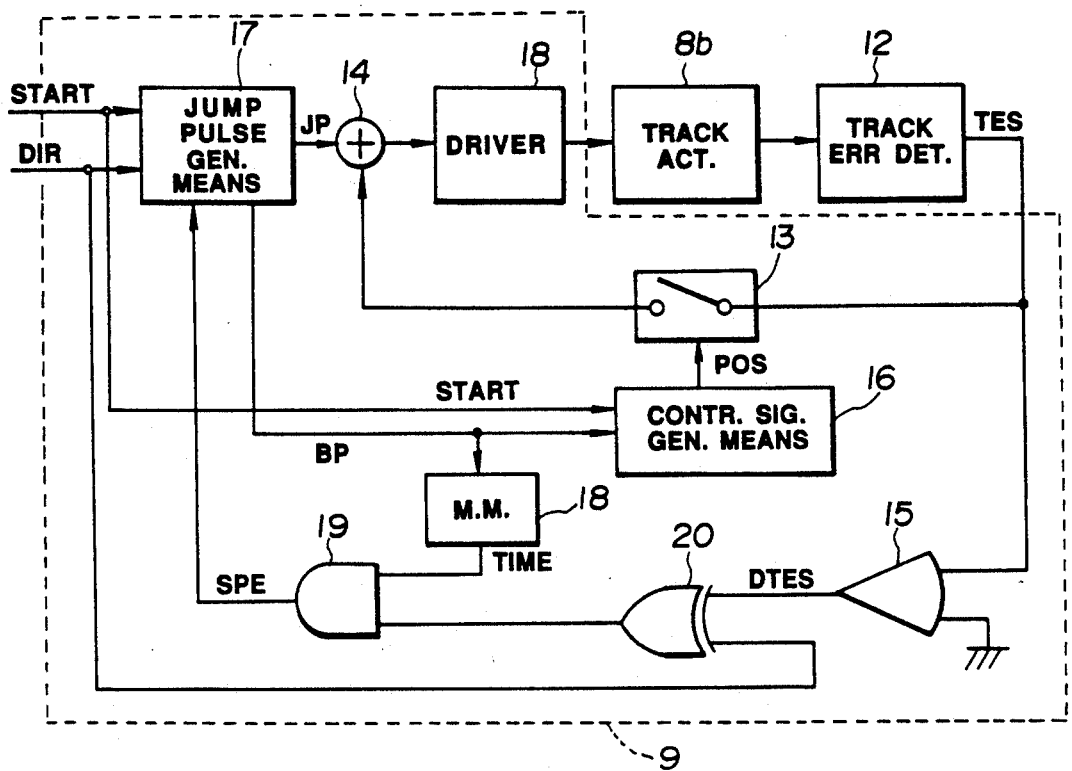
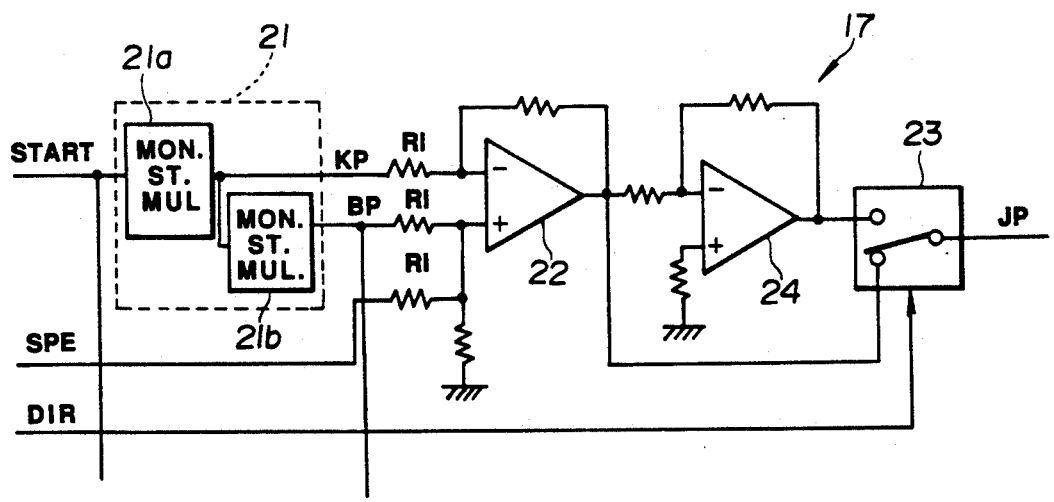

FIG. 5a  START 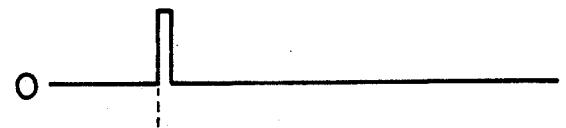
FIG. 5b  KP 
FIG. 5c  BP 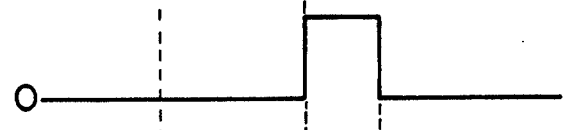
FIG. 5d  JP 
FIG. 5e  POS 
FIG. 5f  TES 
FIG. 5g  DTES 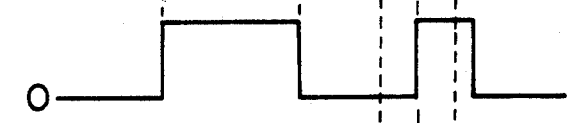
FIG. 5h  DIR 
FIG. 5i  TIME 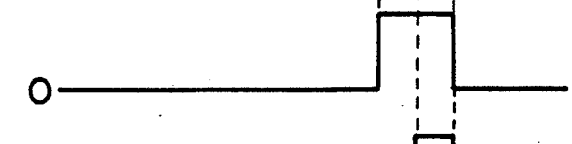
FIG. 5j  SPE 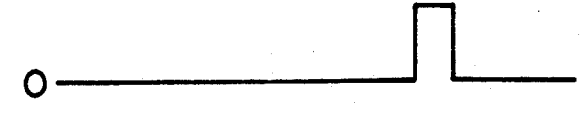

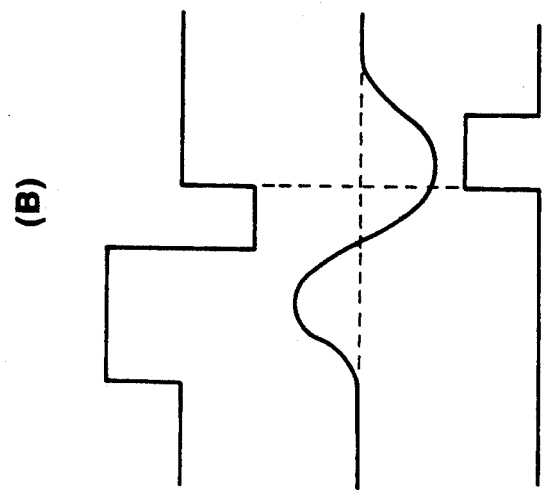
FIG.6a JP
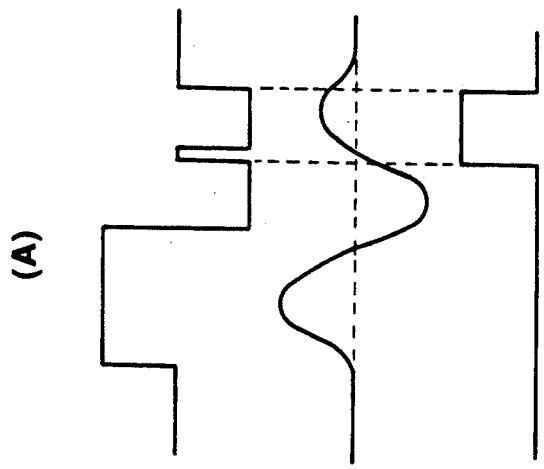
FIG.6b TES
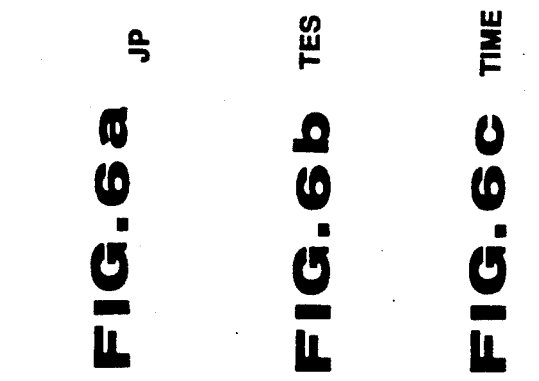
FIG.6c TIME

TRACK JUMP CONTROLLING APPARATUS WHICH CAN OUTPUT DECELERATING PULSES BY SWITCHING A SERVO ON AFTER A FIXED TIME

BACKGROUND OF THE INVENTION

Field of the Invention and Related art Statement

This invention relates to a track jump controlling apparatus for an optical information recording/reproducing apparatus whereby, in order to access a target track, not only accelerating pulses and decelerating pulses but also additional decelerating pulses can be output by switching a servo on after a fixed time.

Recently there is practiced an optical information recording/reproducing apparatus whereby information can be optically recorded and recorded information can be reproduced by radiating a light spot on an optical recording medium.

Generally, in an optical information recording/reproducing apparatus, many information tracks are concentrically circularly provided on a disc-like recording medium (mentioned also as a disc) so that information may be recorded/reproduced by radiating a minute light spot. A track jump controlling apparatus is provided to move such light spot from the now following track to an adjacent track.

In jumping a track, when a tracking servo is first switched off, accelerating pulses and decelerating pulses are applied to a tracking actuator and the tracking servo is again switched on, the light spot will be pulled by this servo into the nearest track and the jump will end. However, in this method, in the case of making a jump in a disc of a large eccentricity, there will be no guarantee that the speed and deflection at which the light spot reaches the track will have been made small enough to pull the light spot into the target track by the tracking servo and, in some case, the light spot will not reach the target track or will, on the contrary, pass over it. Also, by the fluctuation of the driving sensitivity of the tracking actuator, the same disadvantage will be likely to occur.

Therefore, in the prior art examples of the publications of Japanese Patent Application Laid Open Nos. 109538/1989 and 229473/1989 is disclosed a method of reducing the final speed to be small enough wherein the decelerating pulses are made smaller than the accelerating pulses so that the speed at which the light spot can reach the target track may be left, after it is detected that the light spot has reached the target track (or its vicinity), further the decelerating pulses are additionally output and then the tracking servo is switched on.

In the above mentioned prior art examples, in case there is a large eccentricity, the light spot may not reach the target track. That is to say, unless the light spot reaches the target track, the tracking servo will not be closed and therefore it will fail to pull the light spot into the target track. In order to exclude such case, it is thought that the decelerating pulses must be set to be smaller enough than the accelerating pulses but there have been problems that, if they are so set, when the eccentricity in the direction reverse to the accessing direction to the target track is large, in case the light spot has reached the target track, it will have a very large relative speed (to the track) and, even if decelerating pulses are additionally output, it will take time to decelerate the pulses, the tracking servo will be likely to be switched on where the light spot has passed over the range in which the tracking servo pulls in the light spot, it will be difficult to stably access the target track and it will take time to access the target track.

OBJECT AND SUMMARY OF THE INVENTION

An object of the present invention is to provide a track jump controlling apparatus for an optical information recording/reproducing apparatus whereby, even in case the eccentricity of a disc is large, a target track will be able to be accessed more positively.

Another object of the present invention is to provide a track jump controlling apparatus for an optical information recording/reproducing apparatus whereby a target track can be accessed with a simple formation within a short time.

An optical information recording/reproducing apparatus for recording/reproducing information by scanning a recording medium having a plurality of information tracks with a minute light spot has a tracking actuator deflecting said light spot in a direction crossing said information tracks, a tracking error detecting means for detecting the position displacement of said light spot from the center position of said track, a switching means for switching a tracking servo on/off, a means for generating a control signal controlling the on/off operation of said switching means, a track crossing signal generating means for generating accelerating pulses and decelerating pulses to jump tracks and feeding them to said tracking actuator and a time measuring means for starting the measurement of time with decelerating pulses or the like, the above mentioned track crossing signal generating means outputs predetermined accelerating pulses after the tracking servo is switched off and decelerating pulses after the above mentioned accelerating pulses, the above mentioned switching means is switched on at the end of the above mentioned decelerated pulses and then the above mentioned track crossing signal generating means can additionally output decelerating pulses on the basis of the output of the above mentioned tracking error detecting means and the output of the above mentioned time measuring means.

In case it is hard for the light spot to reach the target track due to the eccentricity or the like, in the above mentioned formation, if the tracking servo is switched on after the decelerating pulses to operate the function of pulling the light spot to the target track, the light spot will be able to be pulled into the track. On the contrary, in case the light spot passes over the target track, it will be controlled by the function of pulling the light spot back to the target track by switching the tracking servo on and the additionally output decelerating pulses so that a track jump control may be realized to positively access the target track.

BRIEF DESCRIPTION OF THE DRAWINGS

FIGS. 1 to 6 relate to embodiments of the present invention.

FIG. 1 is a block diagram showing the formation of a track jump controlling apparatus of the first embodiment.

FIG. 2 is a schematic diagram of an optical information recording/reproducing apparatus.

FIG. 3 is a concrete circuit diagram of a jump pulse generating means.

FIG. 4 is a circuit diagram of a control signal generating means.

FIGS. 5a–5j and 6a–6c are operation explaining views of an embodiment.

DETAILED DESCRIPTION OF THE PREFERRED EMBODIMENTS

Figure 2:
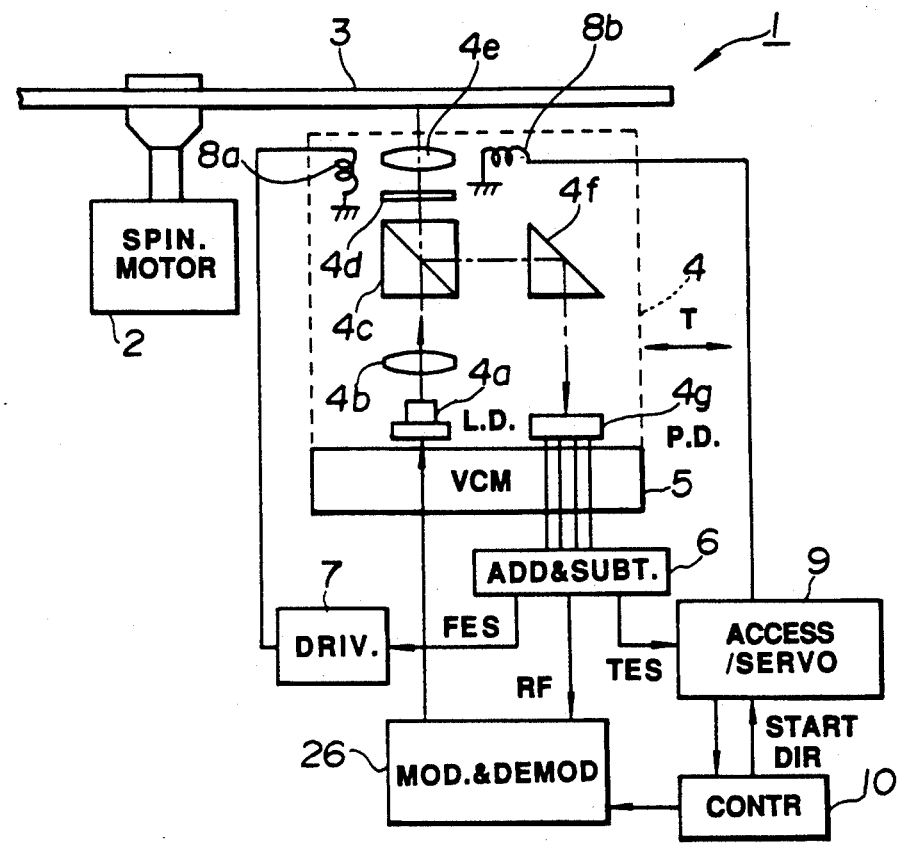

As shown in FIG. 2, an optical information recording/reproducing apparatus 1 provided with an embodiment is provided with an optical head 4 arranged as opposed to a disc-like recording medium (mentioned as a disc hereinafter) rotated and driven by a spindle motor 2. This optical head 4 is made movable in a track crossing direction T crossing the tracks of the disc 3 by such head feeding mechanism as a VCM 5.

This optical head 4 has such beam generating means as, for example, a laser diode 4a built-in so that conically expanding light beams emitted from this laser diode 4a are made parallel light beams by a collimating lens 4b, are made to enter a polarizing beam splitter 4c, for example, by a P polarization, are passed through this polarizing beam splitter 4c by substantially 100%, are passed through a ¼-wavelength plate 4d to be circular polarized light beams, are further condensed by an objective lens 4e and are radiated to the optical disc 3 on which minute light spot is thus formed.

The returning light from this disc 3 is condensed by the objective lens 4e, is passed through the ¼-wavelength plate 4d to be S polarized light beams which are reflected by substantially 100% by the polarizing beam splitter 4c. Then, the light beams are received by a photodetector 4g through a critical angle prism 4f and are photoelectrically converted by the above mentioned photodetector 4g. (By the way, in FIG. 2, for the convenience sake, the critical angle prism 4f is arranged on the right side of the polarizing beam splitter 4c but, in fact, may be arranged above or below the polarizing beam splitter 4c, that is, in the direction vertical to the track crossing direction T.)

The above mentioned photodetector 4g is formed respectively of a pair of devices totaling four divided devices, for example, in the track crossing direction T and the direction vertical to this direction T, the photoelectrically converted outputs of the respective devices are input into an adding and subtracting circuit 6 and are respectively subtracted with the pair of devices to produce a focus error signal FES by a critical angle method and a tracking error signal TES by a push-pull method. Also, a total sum signal RF corresponding to the information recorded in the disc 3 by the addition of the four devices is obtained.

The focus error signal FES is fed to a focus actuator 8a through a phase compensating circuit (not shown) illustrated and driving circuit 7, controls the distance of the objective lens 4e from the disc 3 and controls the focus so that the light spot may be held in a focus state. The tracking error signal TES is input into an access/(tracking) servo controlling circuit 9 accessing the track and controlling tracking to hold the light spot on the accessed track.

This access/servo controlling circuit 9 feeds its output signal to a tracking actuator 8b, controls the movement of the objective lens 4b in the track crossing direction T and makes the accessing operation of accessing the target track from the present track. In the case of making this accessing operation to the target track from the present track by using the tracking actuator 8b, a starting signal or the like for starting a track jump is input into this access/servo controlling circuit 9 from a controller 10. When a tracking servo loop controlling (controlling the position of the light spot in the track crossing direction T) the drive of this actuator 8b by the tracking error signal TES is closed, the light spot radiated to the disc 3 will be held in a following scanning state, that is, a tracking state.

On the other hand, the total sum signal RF is input into a modulating and demodulating circuit 26 for the modulation and demodulation and is demodulated to produce a reproduced signal.

FIG. 1 shows the formation of an access (track jump)/servo circuit 9 of an embodiment for accessing a desired track by jumping tracks.

A tracking error signal TES which is an output of a tracking error detecting means 12 formed of a subtracting circuit within the adding and subtracting circuit 6 is input into an adder 14 through a switch 13 switching the tracking servo on/off and is input into such tracking error signal TES monitoring means as, for example, a comparator 15 detecting zero cross. This switch 13 is controlled in its on/off operation by a control signal generating means 16.

An output signal JP of a track crossing signal generating means 17 for generating at least accelerating pulses for moving a light spot to the target track side by jumping tracks and decelerating pulses for decelerating the moved light spot is also to be input into the above mentioned adder 14. A track jump starting signal START and a jumping direction instructing signal DIR are input into this track crossing signal generating means 17 and an output signal JP corresponding to these signals START and DIR is output.

The output signal of the above mentioned adder 14 drives the tracking actuator 8b through a driver 18 so that the light spot may be moved in the track crossing direction T. A signal corresponding to the displacement of this light spot from the center of the track is detected by a photodetector 4g and a tracking error signal TES, for example, by the push-pull method is produced by the tracking error detecting means 12 by using the photodetector 4g.

When the switch 13 is switched on and the tracking actuator 8b is driven through the adder 14 by the tracking error signal TES, such tracking servo state that the displacement of the light spot from the center position of the track may be zero will be able to be held.

On the other hand, when the switch 13 is switched off and the output signal JP from the track crossing signal generating means 17 is fed to the tracking actuator 8b, the track jump will be able to be made.

The above mentioned track crossing signal generating means 17 outputs to the control signal generating means 16 deceleration instructing pulses BP output after acceleration instructing pulses KP produced by this means 17 and this control signal generating means 16 outputs a control signal POS switching the switch 13 off by an input starting signal START. This signal POS returns to "H" after the deceleration instructing pulses BP are output and the switch 13 is switched on.

Also, the deceleration instructing pulses BP start a monostable multivibrator 18 which becomes a timing means at its fall and outputs an output TIME which becomes "H" for a fixed time. This output TIME is input into an AND gate 19. The passage (gate opening and closing) for the signal input into this AND gate 19 at the other input end is controlled by the output TIME becoming "H" for this fixed time.

The output signal of an exclusive OR circuit 20 is input into this AND gate 19 at the other input end. Into this circuit 20 are input a divalued signal DTES of the tracking error signal TES produced by comparing the tracking error signal TES with, for example, the zero level by a comparator 15 and further the instructing signal DIR. A signal taking the exclusive logical sum of these two signals is output. Their logical product signal SPE is output from the AND gate 19 to the track crossing signal generating means 17 so that decelerating pulses may be additionally output from the track crossing signal generating means 17 by this logical product signal SPE.

That is to say, within a fixed time after the accelerating pulses and decelerating pulses, the tracking error signal TES is monitored by such monitoring means as the comparator 15 as to whether it exceeds such reference level as, for example, the zero level or not. In case the track jump is judged to tend to overrun the zero level, a deceleration instructing signal SPE will be output to the track crossing signal generating means 17 and decelerating pulses will be additionally output. On the other hand, within this fixed time, in case the track jump is judged not to exceed the zero level, decelerating pulses will not be additionally output.

The above mentioned track crossing signal generating means 17 is formed as shown, for example, in FIG. 3.

A starting signal START is input into a pulse generating circuit 21. Acceleration instructing pulses KP are output by the rise of this starting signal START and deceleration instructing pulses BP are output by the fall of these acceleration instructing pulses KP. These pulses KP and BP are input respectively into the reversed and non-reversed input ends of a differential amplifier 22 through resistances Rl.

This pulse generating circuit 21 comprises a first monostable multivibrator 21a started by the starting signal START and outputting acceleration instructing pulses KP becoming "H" for a fixed time and a second monostable multivibrator 21b started by the rise of this first monostable multivibrator 21a and outputting deceleration instructing pulses BP becoming "H" for a fixed time. This pulse generating circuit 21 may be formed of a counter counting clocks of a clock generating circuit.

The output signal SPE of the AND gate 19 is also input through the resistance Rl into the above mentioned differential amplifier 22 at the input end at which the deceleration instructing pulses BP are input. Therefore, the differential amplifier 22 will output signals different in the polarity in case the acceleration instructing pulses KP are input and in case the deceleration instructing pulses BP and signal SPE are input.

The output of this differential amplifier 22 is input into an analogue switch 23 at one terminal and the output of a reverse amplifier 24 reversing the output of the differential amplifier 22 is input at the other terminal. This analogue switch 23 is controlled in switching by a track jumping direction instructing signal DIR and a jump signal JP (for moving the light spot from the present track to a target track) is output from a common terminal of this analogue switch 23. (BY the way, the other resistances than the resistance Rl in FIG. 3. may be the same as the resistance Rl or may be set at different values.)

Figure 4:
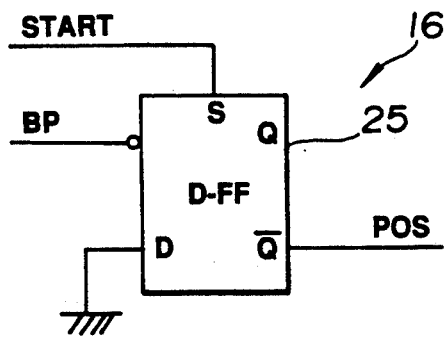

As shown in FIG. 4, the control signal generating means 16 is formed of a D-type flip-flop 25 so that a control signal POS of "L" is output from a reverse output end $\bar{Q}$ by the starting signal START and will return to "H" when the decelerating pulses BP fall.

By the way, the acceleration instructing pulses KP are applied as the jump signal JP (the jump signal in this case accelerates the light spot and is therefore mentioned also as accelerating pulses) to the tracking actuator 7 through a driver 18 and move the light spot radiated to the disc 3 toward the adjacent target track and the time for outputting the acceleration instructing pulses KP is set at a time when the light spot is thought to reach a substantially middle point of the distance between the tracks when, for example, no external turbulence is present. On the other hand, the time for the deceleration instructing pulses BP is a time shorter than the fixed time when the acceleration instructing pulses KP are output, can be made shorter if the characteristic of pulling in of the tracking servo is large and can be determined to be of the most suitable value in response to the size of the external turbulence. Though depending on the characteristic of pulling in of the servo, the outputting time had better be determined to be rather short so that, even after the decelerating pulses, the speed of the light spot moving toward the target track may still remain.

Also, the fixed time by the monostable. multivibrator 18 as a timing means may be set in consideration of the maximum value of the track crossing speed by the eccentricity. In this case, if the amplitude or waveheight value of the accelerating pulses is set to be large, the influence of the track crossing speed by the eccentricity will be able to be made relatively small. In case the accelerating pulses and decelerating pulses are equal to each other in the amplitude, mostly the value obtained by subtracting the pulse width of the decelerating pulses from the pulse width of the accelerating pulses will be substantially sufficient.

The operation of the thus formed embodiment shall be explained in the following.

In the case of jumping tracks, a starting signal START shown in FIG. 5a and a divalued instructing signal DIR (See FIG. 5h) instructing the track jumping direction are input into the track crossing signal generating means 17 from the controller 10.

By this starting signal START, the pulse generating circuit 21 within this track crossing signal generating means 17 outputs acceleration instruction pulses KP shown in FIG. 5b. On the other hand, the D-flip-flop 25 forming the control signal generating means 16 makes the output POS "L" as shown in FIG. 5e, the switch 13 is switched off and the tracking servo is switched off. These acceleration instructing pulses KP become accelerating pulses acting to accelerate the light spot toward an adjacent track. The accelerating direction is determined by selecting with the analogue switch 23 the signal passed through the reverse amplifier 24 (in this case, the acceleration instructing pulses KP) and the signal not passed by the instructing signal DIR and is output as a jump signal shown in FIG. 5d through this analogue switch 23.

By the above mentioned acceleration instructing pulses KP (or jump signal JP) the light spot begins to move toward the adjacent track, this displacement is detected as a tracking error signal TES obtained by the tracking error detecting means 12 and this tracking error signal TES increases first as positive as shown in FIG. 5f. (If the value of the instructing signal DIR is different, it will increase as negative.)

After the acceleration instructing pulses KP are output for a predetermined time, the deceleration instructing pulses BP are output as shown in FIG. 5c. As understood from FIG. 3, by the differential amplifier 23, these deceleration instructing pulses BP are made to be of a polarity reverse to that of the acceleration instructing pulses KP and are output as a jump signal JP through the analogue switch 23. These deceleration instructing pulses BP are so set as to end in a time shorter than of the acceleration instructing pulses KP. When these deceleration instructing pulses BP end, the control signal POS will return to "H" as shown in FIG. 5e, the switch 13 will be switched on, a tracking servo state will be made again, the monostable multivibrator 18 will be triggered, the output TIME will become "H" for a fixed time from this time as shown in FIG. 5i, it will be detected whether the divalued signal DTE (of the tracking error signal TES) of the comparator 15 will become positive or not through the exclusive OR circuit 20 during the time of this "H" and, in case it becomes positive, it will be input into the track crossing signal generating means 17 through the AND gate 19.

As the energy of the decelerating pulses is made smaller than the energy of the accelerating pulses, usually, even after the decelerating pulses, the speed tending to cross the track will remain in the light spot, also the tracking servo will operate and therefore, in most cases, the light spot will pass over the adjacent target track with some speed.

This passing over can be known from the fact that the output of this circuit 20 will become "H" when the divalued signal DTE of the tracking error signal TES and the instructing signal DIR showing the track jumping direction are passed through the exclusive OR circuit 20.

When the light spot passes over the target track, the divalued signal DTES will become "H" as shown in FIG. 5g and, if the time when this signal DTES becomes "H" is while the output TIME of the monostable multivibrator 18 is "H", the output SPE of the AND gate 19 will become "H" as shown in FIG. 5j. As this output SPE is input into the differential amplifier 22 forming the track crossing signal generating means 17 at the input end of the same polarity as of the deceleration instructing pulses BP, the jump signal JP functioning as decelerating pulses will be additionally output as shown in FIG. 5d through the analogue switch 23. By these additionally output decelerating pulses, the light spot will be decelerated in addition to the decelerating function by switching the servo on and will be quickly pulled back into the target track. In FIG. 5, an ordinary case that the eccentricity of the disc 3 is not so large has been assumed and explained.

FIGS. 6(A) and (B) show operating waveforms in case there is a large eccentricity in the disc 3.

FIG. 6(A) is of the case that the jump direction and the direction of the eccentric acceleration are reverse to each other. FIG. 6(B) is of the case that they are in the same direction. In the case of FIG. 6(A), as shown in FIG. 6(a), the jump signal JP (by a predetermined accelerating pulse and decelerating pulse part) will be output (the same as is explained with reference to FIG. 5). However, as the eccentric acceleration is reversely directed, the target track will be reached before the light spot moves for the distance between the tracks for which the light spot is to be inherently moved by this jump signal. That is to say, the light spot will reach the target track faster than in the usual case (that the eccentricity is not so large)(See the timing relation in FIGS. 5f and 5i supposed to be of the usual case and the timing relation of (b) and (c) in FIG. 6(A)).

When the target track is reached earlier than in the usual case, as the output TIME of the monostable multivibrator 18 is so set as to have already become "H" before the time when it is reached, the relative speed with the track tending to pass over the target track then will be large but, by the function of the servo switched on and the additionally output longer decelerating pulses, the light spot will be well decelerated and will be pulled into the target track.

On the other hand, in the case of FIG. 6(B), it will take time for the light spot to reach the target track and the light spot will reach the target track after the output TIME of the monostable multivibrator 18 returns to "L", therefore will have no decelerating pulse output and will be pulled by the tracking servo into the target track.

According to this embodiment, even in case the light spot is hard to reach the target track by the eccentricity or the like, as the tracking servo is switched on after the decelerating pulses, by this tracking servo, the light spot will be able to be pulled toward and into the target track. On the contrary, in case the light spot has reached the target track by the eccentricity or the like in the direction reverse to the jump direction or has an over-passing speed, by the function of the tracking servo and the additionally output decelerating pulses, this over-passing (over-run) will be able to be suppressed and the light spot will be able to be pulled into the target track.

By the way, in the above described embodiment, the time of the decelerating pulses is made shorter than the time of the accelerating pulses (in the case that the waveheight values of both are made equal to each other) but the waveheight value of the decelerating pulses may be made shorter (smaller) than the waveheight value of the accelerating pulses so as to operate substantially the same. Also, the product of the time width and waveheight value may be so set as to be larger on the accelerating pulse side.

In the above mentioned example, the tracking servo function is utilized more effectively than in the prior art example and the tracking error signal is monitored so that the accelerating pulses may be additionally output as required.

That is to say, in the prior art example, there are defects that, as a track jumping state over-running as much as possible is set to decelerate the over-running with decelerating pulses, if there is an eccentricity in the direction reverse to the track jumping direction, a more largely over-running state will be made, even if the speed is decelerated, it will take time for the deceleration and, even if the track servo is switched on later, the light spot will not be able to be pulled in or it will take time to pull the light spot into the target track, whereas, in the embodiment, the light spot need not jump the track so much as to over-run it, therefore even if there is an eccentricity, the light spot will be able to be stably pulled in and, even in case the eccentricity is large or the servo pulling in characteristic of the tracking servo system is small, the apparatus will function more effectively.

As described above, in the present invention, it is not required to jump the track so much as to over-run it and therefore, even in case the accelerating pulses and decelerating pulses are set to be equal to each other, the apparatus may be effective.

In the above described explanation, it has been explained to jump one track but it is possible to jump over a plurality of tracks by substantially the same method by repeating jumping one track.

A disc on which information tracks are concentrically circularly or spirally formed has been explained in the above but it is apparent that the present invention can be applied also to such case that information tracks are formed like parallel lines (by snaking or the like) as an optical card.

As described above, according to the present invention, the tracking servo is switched on after accelerating pulses and decelerating pulses are output, the zero cross of the tracking error signal after the decelerating pulses is detected and further the decelerating pulses can be additionally output in response to this detected output so that, even in case the light spot is hard to reach the track, as the tracking serve is switched on, the light spot may be pulled into the target track and, in case the light spot passes over the target track, it may be decelerated by the decelerating pulses and may be stably pulled into the target track.

By the way, the present invention is not limited to the above described embodiment but can form different embodiments by modifying a part or the like.

What is claimed is:

1. A track jump controlling apparatus comprising:
    an optical head including a light beam generating means for radiating a light beam to an optical recording medium, an optical system condensing said light beam, radiating said light beam onto an optical recording medium and forming a minute light spot on said optical recording medium and a photodetector receiving a reflected light from said optical recording medium through said optical system;
    a track error signal detecting means for detecting a track error signal representing a displacement in the track crossing direction crossing tracks from the central position of the tracks formed on said recording medium from a signal photoelectrically converted by said photodetector;
    an actuator provided in said optical head, driving at least a part of said optical system and moving said light spot in said track crossing direction;
    a switching means for switching on/off a tracking servo feeding back the output signal of said track error signal detecting means for driving said actuator and switching on/off said tracking servo driving said actuator;
    a track crossing signal generating means for generating one of an accelerating signal at the time of accelerating said light spot in said track crossing direction and a decelerating signal at the time of decelerating said light spot in said track crossing direction;
    a controlling means for outputting to said switching means a control signal controlling said switching means to be off as synchronized with the start of the output of said track crossing signal and controlling said switching means to be on as synchronized with the end of the output of said track crossing signal;
    a time measuring means for measuring a predetermined time from a timing when said track crossing signal is output;
    a judging means for monitoring said track error signal for a predetermined time measured by said time measuring means and judging whether said light spot is to be decelerated or not; and
    a movement suppressing signal outputting means for feeding said actuator with a movement suppressing signal for suppressing the movement of said light spot after said switching means is controlled to be on for turning on said tracking servo only when a judging signal judged by said judging means to be decelerated is outputted.

2. A track jump controlling apparatus according to claim 1 wherein said track crossing signal generating means generates an accelerating signal moving said light spot in said track crossing direction and a decelerating signal decelerating the movement of said light spot accelerated by said accelerating signal and sequentially feeding said accelerating signal and decelerating signal to said actuator.

3. A track jump controlling apparatus according to claim 1 wherein said controlling means operates said switching means to be off as synchronized with the output start of said accelerating signal and operates said switching means to be on as synchronized with the output end of said decelerating signal.

4. A track jump controlling apparatus according to claim 1 wherein said predetermined time is a fixed time.

5. A track jump controlling apparatus according to claim 1 wherein said judging means is formed of a comparator comparing whether said track error signal exceeds a reference level or not and a gate means for gating the passage of the output signal of said comparator with the pulse output within said predetermined time of said time measuring means.

6. A track jump controlling apparatus according to claim 5 wherein said comparator is a zero cross comparator in which said reference level is made zero.

7. A track jump controlling apparatus according to claim 1 wherein said judging means comprises a means for detecting that said light spot has reached the moving target track by said track crossing signal.

8. A track jump controlling apparatus according to claim 2 wherein said track crossing signal generating means outputs said decelerating signal different in the polarity from said accelerating signal.

9. A track jump controlling apparatus according to claim 1 wherein said track crossing signal generating means outputs said decelerating signal of a pulse width shorter than of said accelerating signal.

10. A track jump controlling apparatus according to claim 2 wherein, in said track crossing signal generating means, said optical recording medium is a circular plate-like disc and the pulse width of said accelerating signal is so set as to output said accelerating signal until said light spot reaches substantially ½ of 1 track pitch in case said disc is rotated and driven without an eccentricity.

11. A track jump controlling apparatus according to claim 2 wherein, in said track crossing signal generating means, the pulse width of said accelerating signal is so set as to output said accelerating signal until said light spot reaches substantially ½ of 1 track pitch of said optical recording medium.

12. A track jump controlling apparatus according to claim 2 wherein said controlling means is a D type flip-flop set by a track jump starting signal and reset by said decelerating signal output end.

13. A track jump controlling apparatus according to claim 2 wherein said time measuring means is a monostable multivibrator started for a fixed time by the fall of said decelerating signal.

* * * * *